United States Patent
Courouble

(10) Patent No.: US 12,524,601 B2
(45) Date of Patent: Jan. 13, 2026

(54) SECTIONS FOR THEMES

(71) Applicant: Shopify Inc., Ottawa (CA)

(72) Inventor: Thibaut Courouble, Ottawa (CA)

(73) Assignee: Shopify Inc., Ottawa (CA)

( * ) Notice: Subject to any disclaimer, the term of this patent is extended or adjusted under 35 U.S.C. 154(b) by 401 days.

(21) Appl. No.: 18/073,103

(22) Filed: Dec. 1, 2022

(65) Prior Publication Data

US 2023/0088547 A1    Mar. 23, 2023

Related U.S. Application Data

(63) Continuation of application No. 16/387,884, filed on Apr. 18, 2019, now abandoned.

(51) Int. Cl.
*G06F 40/14* (2020.01)
*G06F 3/0483* (2013.01)
*G06Q 30/06* (2023.01)
*G06Q 30/0601* (2023.01)

(52) U.S. Cl.
CPC ............ *G06F 40/14* (2020.01); *G06F 3/0483* (2013.01); *G06Q 30/0641* (2013.01)

(58) Field of Classification Search
CPC .... G06F 40/14; G06F 3/0483; G06Q 30/0641
See application file for complete search history.

(56) References Cited

U.S. PATENT DOCUMENTS

| | | | | |
|---|---|---|---|---|
| 6,286,043 | B1 * | 9/2001 | Cuomo | H04L 69/329 |
| | | | | 709/224 |
| 7,610,219 | B2 * | 10/2009 | Sayed | G06Q 30/0641 |
| | | | | 705/26.2 |
| 8,621,341 | B2 | 12/2013 | Kern | |
| 8,825,627 | B1 * | 9/2014 | Indukuri | G06F 16/904 |
| | | | | 707/738 |
| 2004/0194028 | A1 | 9/2004 | O'Brien | |
| 2009/0305682 | A1 * | 12/2009 | Spalink | G06F 16/9577 |
| | | | | 455/414.3 |
| 2011/0029561 | A1 | 2/2011 | Slaney | |
| 2016/0284007 | A1 | 9/2016 | Sakai | |
| 2018/0012282 | A1 * | 1/2018 | Mattingly | G06Q 30/0641 |
| 2018/0268458 | A1 | 9/2018 | Popa | |

OTHER PUBLICATIONS https://shopify.dev/tutorials/develop-theme-use-sections; Jul. 31, 20220; pp. 1-33.

* cited by examiner

*Primary Examiner* — Stephen S Hong
*Assistant Examiner* — Carl E Barnes, Jr.
(74) *Attorney, Agent, or Firm* — Rowand LLP

(57) ABSTRACT

A computer-implemented method and system may include receiving a theme change request, wherein the theme change request requests a change from a first theme to a second theme for rendering online data as configured by a section file; comparing, by a section matching engine, at least one characteristic of the section data and at least one characteristic of a section file; and rendering the section data in the second theme if the at least one characteristic of the section data resembles the at least one characteristic of the section file.

20 Claims, 6 Drawing Sheets

SECTIONS FOR THEMES

CROSS-REFERENCE TO RELATED APPLICATIONS

The present application is a continuation of U.S. patent application Ser. No. 16/387,884, filed Apr. 18, 2019, the contents of which are hereby incorporated by reference.

FIELD

The present disclosure relates generally to managing web-based content, and more specifically to the presentation design for web-based content.

BACKGROUND

Presentation of web-based content through service applications is often provided through presentation design themes that configure the content in a pleasing manner. A service provider may provide a user with a variety of themes to choose from, where once the theme is selected the user inputs content and the theme presents the user's content in a consistent manner with respect to the chosen theme. However, once a user selects a theme and has populated web pages with content through the theme, it is not easy to switch to an alternative theme without the user having to re-input or manually transfer the content to the new theme and re-build each webpage to accommodate the configuration requirements of the new theme. Re-building can be time consuming and burdensome for the user. There is a need for methods and systems that enable switching themes that minimize the need to manually re-input and/or re-configure the presentation of content.

SUMMARY

In an aspect, a computer-implemented method may include receiving, at an e-commerce platform from a merchant computing device, a theme change request for an online store, wherein the online store comprises online store information comprising section data, the section data rendered in a first page section of a plurality of page sections on a first online page as configured by a first section file of a first online store theme, wherein the theme change request requests a change from the first online store theme to a second online store theme for rendering the section data in a second page section of a plurality of page sections on a second online page as configured by a second section file of the second online store theme; comparing, by a section matching engine, at least one characteristic of the section data configured by the first section file for rendering in the first page section and at least one characteristic of the second section file; and rendering the section data on the second page section as configured by the second section file if the at least one characteristic of the section data configured by the first section file resembles the at least one characteristic of the second section file. In embodiments, the section data may include content data or presentation data and the at least one characteristic of the section data may be related to one or more of a content number, a content type, a presentation setting, a presentation setting type, and a combination thereof. The second section file and the at least one characteristic of the second section file may be related to at least one of templating code or Hypertext Markup Language. The computer-implemented method may further include optimizing, by the section matching engine, the section data for the first page section on the second page section based on comparing the at least one characteristic of the section data for the first page section and at least one characteristic of the second section file for the second page section, wherein optimizing is provided through adjustments associated with mismatches between the section data and a data model of the section data that the second section file is able to render. The first page section may be a display element or region of displayed elements on the first online page that render the section data as configured by the first section file, such as where the first online page is a webpage. The second page section may be an element or region of elements configured to display the section data on the second online page as configured by the second section file, such as where the second online page is a webpage. The first online store theme and the second online store theme may each comprise a set of rules dictating how page sections and section data are rendered on the first online page and the second online page. Comparing the at least one characteristic of the section data for the first page section and at least one characteristic of the second section file for the second page section may result in a characteristic match for the rendering of standardized data of the first page section to the second page section. Comparing the at least one characteristic of the section data for the first page section and at least one characteristic of the second section file for the second page section may result in a characteristic mismatch, wherein the section matching engine adjusts a configuration setting in the section data. The adjusting may decrease the characteristic mismatch. The adjusting may alter the section data as presented in a first presentation configuration on the first page section to a second presentation configuration on the second page section. The section data may include a plurality of images, such as where the first presentation configuration presents the plurality of images in a first configuration and the second presentation configuration presents the plurality of images in a second configuration. The section data may include at least two contextually related data stored as a result of merchant actions. The section data is stored as a result of merchant actions associated with changes to the plurality of page sections on the first online page.

In an aspect, a system may include an e-commerce platform including at least one processor and at least one memory, the e-commerce platform adapted to receive a theme change request for an online store, wherein the online store comprises online store information comprising section data, the section data rendered in a first page section of a plurality of page sections on a first online page as configured by a first section file of a first online store theme, wherein the theme change request requests a change from the first online store theme to a second online store theme for rendering the section data in a second page section of a plurality of page sections on a second online page as configured by a second section file of the second online store theme; and a section matching engine adapted to compare at least one characteristic of the section data configured by the first section file for rendering in the first page section and at least one characteristic of the second section file, wherein the e-commerce platform is adapted to render the section data on the second page section as configured by the second section file if the at least one characteristic of the section data configured by the first section file resembles the at least one characteristic of the second section file. In embodiments, the section data may include content data or presentation data and the at least one characteristic of the section data is related to one or more of a content number, a content type, a presentation setting, a presentation setting type, and a combination thereof. The second section file and the at least one characteristic of the second section file may be related to at least one of templating code or Hypertext Markup Language. The system may further include the section matching engine optimizing the section data for the first page section on the second page section based on comparing the at least one characteristic of the section data for the first page section and at least one characteristic of the second section file for the second page section, wherein optimizing is provided through adjustments associated with mismatches between the section data and a data model of the section data that the second section file is able to render.

In an aspect, a computer-implemented method may include receiving, at an e-commerce platform from a merchant computing device, a theme request for an online store, wherein the online store comprises online store information comprising section data, wherein the theme request requests adapting the section data for rendering in a page section of a plurality of page sections as configured by a section file of an online store theme; comparing, by a section matching engine, at least one characteristic of the section data and at least one characteristic of the section file; and rendering the section data on the page section if the at least one characteristic of the section data resembles the at least one characteristic of the section file. In embodiments, the section data may have been configured for rendering through a first section file of a first online store theme prior to the received theme request. The computer-implemented method may further include receiving, at the e-commerce platform from a user interface on the merchant computing device, a data change request for changing section data, and in response, adapting the section data for rendering the section data on the page section as configured by the section file of the online store theme.

In an aspect, a system may include an e-commerce platform including at least one processor and at least one memory, the e-commerce platform adapted to receive a theme request for an online store, wherein the online store comprises online store information comprising section data, wherein the theme request requests adapting the section data for rendering in a page section of a plurality of page sections as configured by a section file of an online store theme; and a section matching engine adapted to compare at least one characteristic of the section data and at least one characteristic of the section file, wherein the e-commerce platform is adapted to render the section data on the page section if the at least one characteristic of the section data resembles the at least one characteristic of the section file. In embodiments, the section data may have been configured for rendering through a first section file of a first online store theme prior to the received theme request. The system may further include a user interface displayed on a merchant device, the e-commerce platform adapted to receive from the user interface a data change request for changing section data, and in response, adapt the section data for rendering the section data on the page section as configured by the section file of the online store theme.

In an aspect, a computer-implemented method for a user interface may include displaying a merchant user interface on a merchant computing device for configuring a theme change to an online store theme, wherein the online store theme renders section data through a section file; receiving, at an e-commerce platform from the merchant computing device, a theme request and a stream of data entry actions; comparing, by a section matching engine, at least one characteristic of the section data and at least one characteristic of the section file; and rendering the section data on the merchant user interface based on the stream of data entry actions and based on if the at least one characteristic of the section data resembles the at least one characteristic of the section file.

In an aspect, a system for a user interface may include a merchant client device displaying a merchant user interface for rendering section data as configured by a section file of an online store theme, the merchant client device configured to store a set of instructions that, when executed, cause the merchant client device to: display a merchant user interface on a merchant computing device for configuring a theme change to an online store theme, wherein the online store theme renders section data through a section file; receive, at an e-commerce platform from the merchant computing device, a theme request and a stream of data entry actions; compare, by a section matching engine, at least one characteristic of the section data and at least one characteristic of the section file; and render the section data on the merchant user interface based on the stream of data entry actions and based on if the at least one characteristic of the section data resembles the at least one characteristic of the section file.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
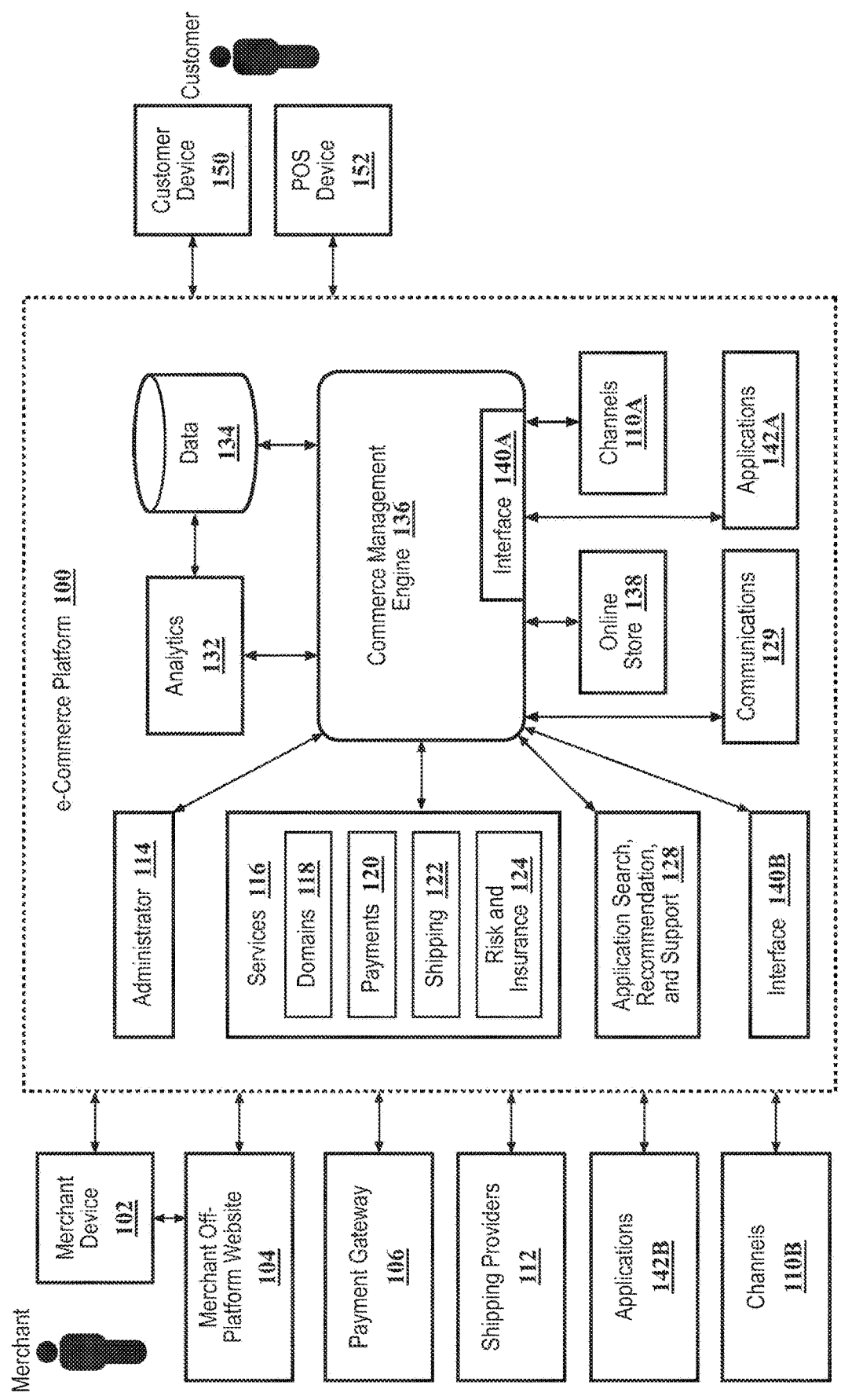
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
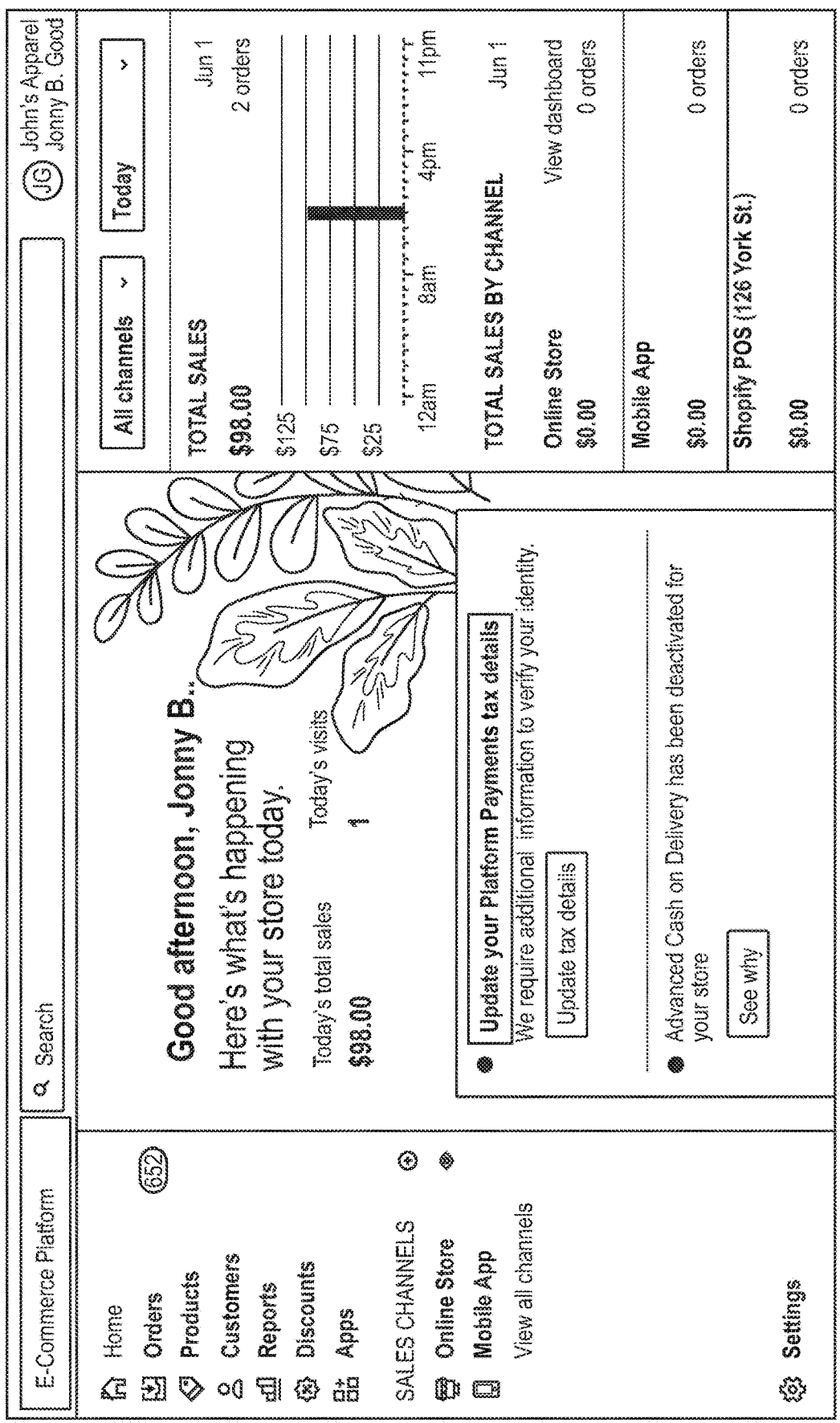
FIG. 2 depicts an embodiment for a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or noncritical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips.

The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide online store users (e.g., merchants, developers, and the like) with a selection of themes for online stores (for example, for presenting products to customers). Although the term theme is used throughout this disclosure, it is not meant to be limiting in any way, and one skilled in the art will appreciate that a theme may be a presentation design theme or scheme, template, layout, web template, web theme and the like, that may configure content in a systematic and desired or pleasing manner, and where different themes may present the same web-based content in different ways. As such, themes may also lead to an increased number of visits to a website, increased sales for an online store, meet regulations in different jurisdictions or countries (e.g., for accessibility), and the like.

Themes can also be used in web applications other than online stores. For example, they may be in used in connection with general web design applications such as websites, pages or blogs that may not contain any commerce features. Although the following disclosure is in relation to online stores specifically, the principles described herein are not limited as such and are not meant to be limiting in any way. One skilled in the art will appreciate that they may be generally applied to any web design application.

Themes provided by the e-commerce platform 100 may provide the user with a choice of different aesthetic layouts for presenting online store products and other information and content. Choosing one of the themes made available through the e-commerce platform 100 may save the user time in creating a look that is appropriate and appealing for the online store 138. The e-commerce platform 100 may provide a user interface view of a plurality of themes to choose from, such as allowing a user to see typical visual presentations of sample products and content as displayed through a plurality of themes. Once the user selects a theme for use, the user may be provided instructions to help them set up online content and information on pages within the presentation requirements of the theme. For instance, a theme may provide for a home page for the online store 138, such as including a section for a company name, a section for displaying a series of offered products (e.g., a sliding gallery of products, a slideshow of products, and the like), a section with site navigation links (e.g., products, product collections, search, payment and checkout, and the like), a section with a banner including corporate name and disclaimers, and the like. Segmentation of online store pages into a customizable selection of sections or segments allows a given theme to offer and specify section functions (e.g., placement, layout, format, and the like) for presentation of online store content and information on the page within the presentation look and feel of the selected theme. A given theme may specify a number of different theme sections to choose from where each section provides different presentation attributes. For instance, a user may select a theme for how it presents online store content for the user's audience, such as with respect to product placement, visual presentation, customization options, and the like. Choosing an existing theme for presenting online store content allows the user to select a theme that in the view of the user best presents the user's products to the user's online store target audience. The e-commerce platform 100 saves the user the time it would take to create a custom theme, so a user can choose to take that time to develop and maintain the online store without focusing on the mechanics for the aesthetics of web-content presentation.

Once a user selects a theme for the online store 138 the user may begin creating pages and populating the page sections with online store information (e.g., company information, product images and/or videos, product descriptions, cost information, shipping options, page resources, blog post, and the like, to build the user's online store). Online store information may grow over time as a user adds more online store information, such as adding online store information to an existing section or adding online store information to a new section or creating new pages (e.g., with respect to new products, new service offerings, new resources, latest industry news, social media content, and the like).

Figure 3:
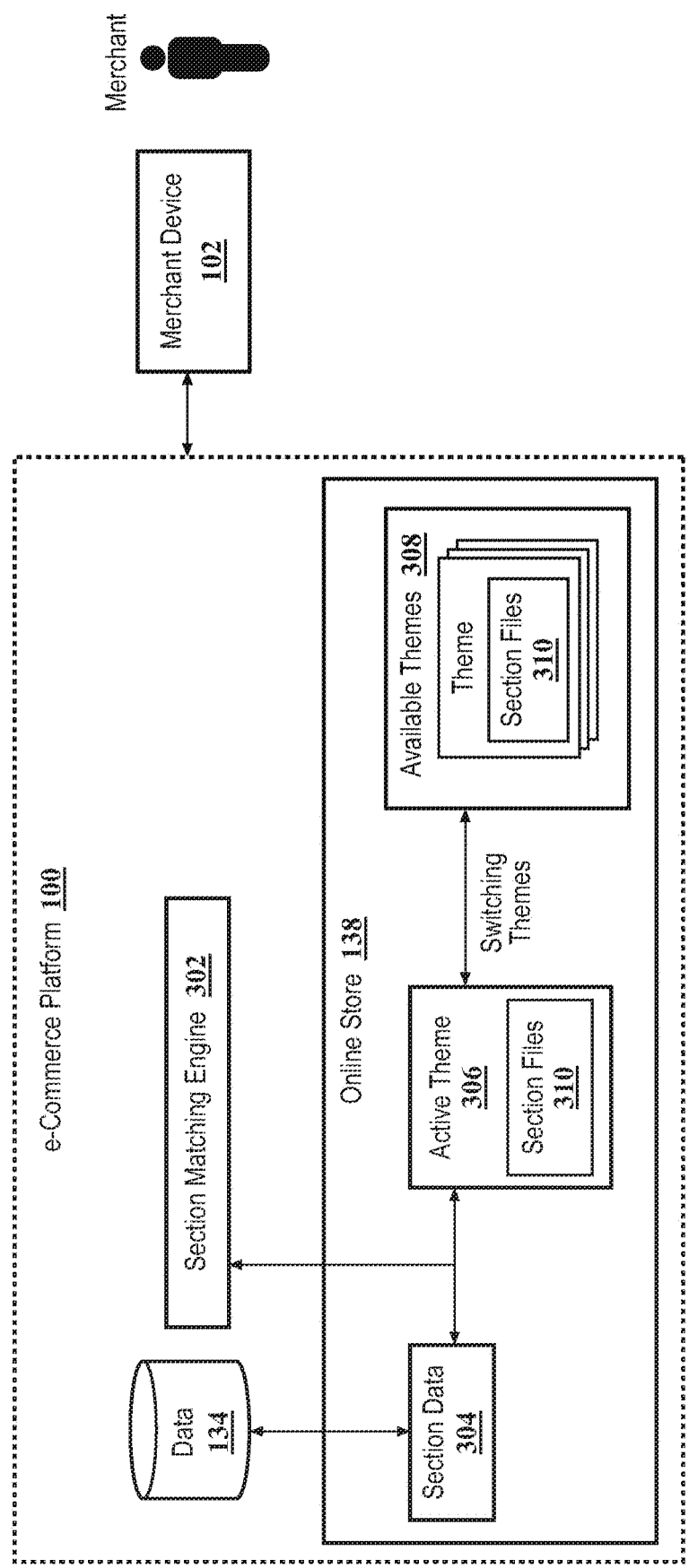
FIG. 3 depicts an embodiment functional block diagram for an e-commerce platform with a section matching engine.

In embodiments, a user may apply online store information to a theme, preview new themes, or request to switch themes for the online store, such as where the online content and information that the user has applied to a first theme is previewed between or switched from the first theme to a second theme. Referring to FIG. 3, data rendered (e.g., content data, presentation data, product data, online store data, payment facility data, service provider data, and the like) in online store webpages through pages of a theme may be stored in a section data 304 repository that is external to the currently active theme 306, and a section matching engine 302 may provide matching functions associated with the display of section data 304 across different themes over time (e.g., when a user previews or switches themes). For instance, the section matching engine 302 may allow users to preview what their online store 138 would look like with a new theme before they actually make (e.g. persist) the change. The section matching engine 302 may, using at least in part the section data 304 and one or more section files 310 of sections of a target theme, match the section data 304 (e.g., as configured through a data model) to the sections of the new theme. For example, the section matching engine 302 may match the section data 304 to a section file 310 of the new theme (e.g., the output of the section matching engine is the section file itself). Section files 310 are configured for rendering the section data 304 in a section, such as through fields, attributes and parameters associated with rendering the section data 304 as web content. The section matching engine 302 may optimize the presentation of the section data 304 within the theme, such as through adjustments associated with mismatches between section data 304 and the data model of the section data that the section files of a new theme are able to render. The section matching engine 302 may match section data 304 with the most fitting section file 310 in a theme in order to display the content. The section matching engine 302 may have additional mechanisms that allow for information that is not critical for reuse across themes (e.g., presentation data) to be reused at least in part across the section files 310 of different themes, such as when those section files 310 have compatible data models for that information. In embodiments, a data model associated with data that is typically managed to be reused across themes (e.g., content data) may be controlled by the e-commerce platform 100 (e.g., through standardization of section fields and functions), while the data model of data not typically re-used (e.g., presentation data) may be left to be determined by the themes and their section files 310 (e.g., so that different themes can create unique designs), thus enabling flexibility and creativity amongst the available themes 308.

Themes represent a set of rules that dictate how sections and section data 304 will be presented on a page, such as a web page, and functions as a presentation layer that may include presentation options or parameters. In embodiments, themes may include one or more sections files, where a theme may be viewed as a set of section files 310, with additional files to support those section files 310 (e.g., global configuration files, global assets such as images, translation data, and the like). Sections are customizable blocks that determine the layout of different pages presented on an online store, such as an item of information or content or a container for an item of information or content and information regarding the presentation of that information/content. Sections may be rendered by a theme as elements of a page, such as a webpage. For instance, sections may be full-width portions of a web page, such as a header, footer, slideshow, image gallery, and the like. In themes, section files 310 may contain templating code to generate the Hypertext Markup Language (HTML) for that portion of the page. Section files 310 may also include configuration data, such as for configuring the customization options for a section. A user may use sections to modify the content and layout of different pages on the online store, as well as using theme settings to customize an online store's appearance (e.g., changes to fonts and colors, social media links, and checkout settings). In embodiments, more than one theme may be used simultaneously. For example, a user may use one theme (e.g., Theme A) for product pages, but for a main page they may use a second theme (e.g., Theme B), and for other pages they may use a third theme (e.g., Theme C). As such, the user may not only be able to preview or switch an overall theme for the online store 138 but may customize different aspects of the online store content presentation utilizing a mix of themes and sections.

The online store information may be stored as section data 304 in association with the online store 138 and communicatively coupled with but stored separately from the active theme 306 of the online store 138 or any alternate available themes 308 available to the user. That is, all online store information utilized by the theme for presentation, whether entered or uploaded by the user or made available through the data facility 134, may be stored as section data 304 (e.g., stored in a section data repository as part of the data facility 134), and the section data 304 is coupled with the active theme 306 for presentation of the online store information as web content. Section data 304 may be collected directly from a user, input directly by a user or collected or inferred as a user interacts with one or more themes or sections. Section data 304 may include pointers or references to data stored outside the section data repository such as within the data facility 132 of the e-commerce platform 100. For example, for a given product image a data model may store the data location from which to obtain the inventory of that product, so that information may be presented in a theme section with the image.

Figure 4:
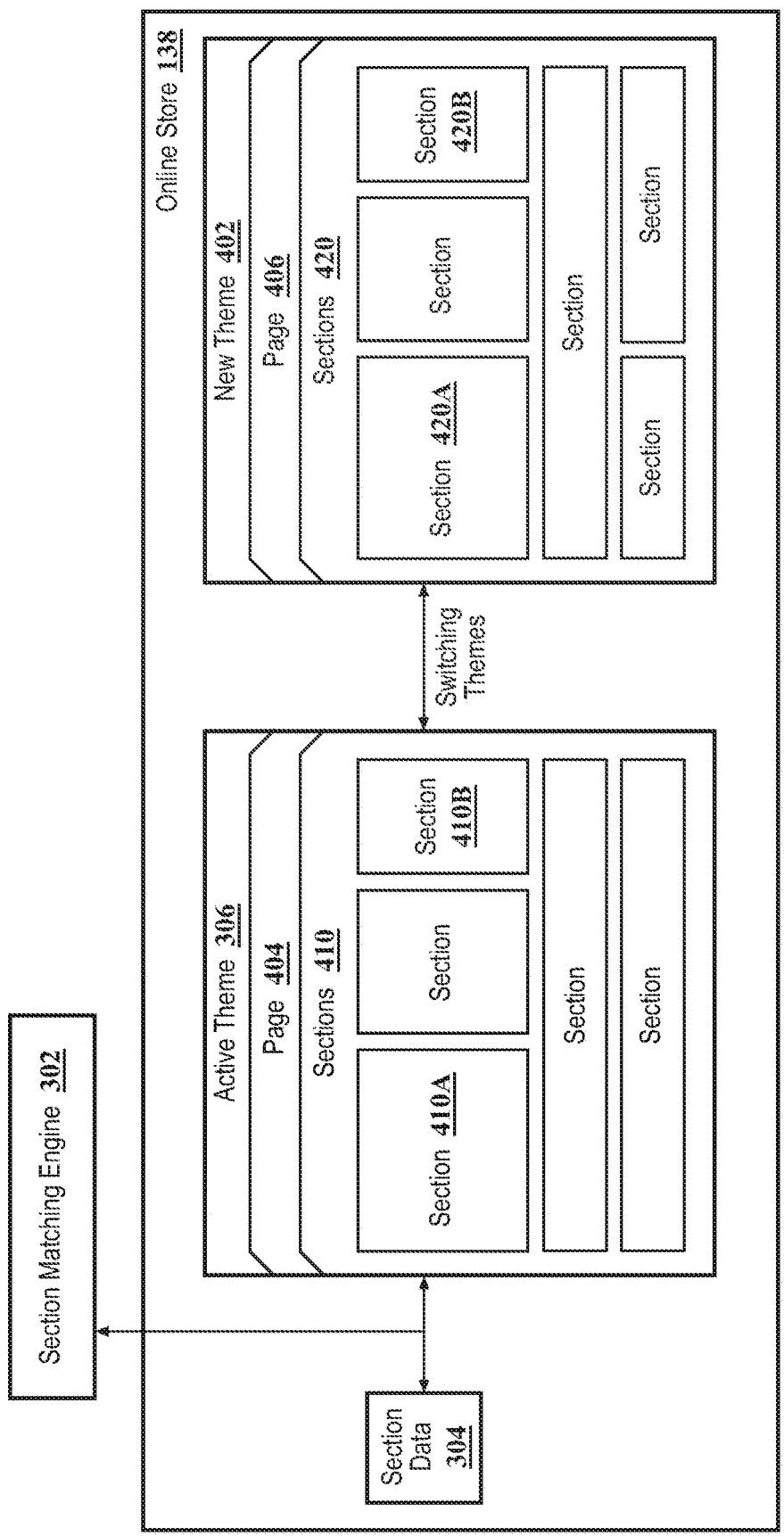
FIG. 4 depicts an embodiment functional block diagram for the section matching engine.

Referring to FIG. 4, themes 306 and 402 may include pages 404 and 406 which may include sections 410 and 420, where each theme determines the available pages and sections. Each type of page (e.g., display element or region of displayed elements) may have its own section layout (e.g., each section with associated section data). For example, a product page section may determine the layout of each product page on an online store. Page sections may be located by the theme in specific places, where the user may then customize the sections to different degrees dependent on section configuration constraints. For instance, sections may be static or dynamic. Static sections may be customized by the user (e.g., editing the content) but not moved or removed. For example, each theme may include fixed sections, such as the header and footer, that show on every page of a user's online store. Static sections may be reused across the online store, where when a user changes the configuration of a static section in one place, that change will apply to all other places where the section is included (e.g., all footers or headers on the online store). Dynamic sections may have more flexibility, such as the user being able to add, rearrange, remove or hide the section, where users may configure the sections and reorder their appearance. In embodiments, the e-commerce platform may track in various ways the changes that users make to their pages, and the context in which they are making them (e.g., for the theme they are using, the state of various resources at the time, and the like). For instance, information may be collected when a user inputs and saves data through a user interface.

Section data 304 may be stored in association with or using a data model representing a schema for the data, and the data model may be used by the section matching engine 302 in matching section data 304 to a section file. For example, section data 304 may have a data model that can be accommodated by a section file 310 of a section for a new theme, and so be switched or populated to that section by the section matching engine 302. The data model may capture the context of and relationships between and among sections and elements of a sections and the section data 304. The data model for section data 304 may be used by the section matching engine 302 to help determine if the section data 304 can be accommodated in one of a plurality of sections of a new theme based in part on the section files 310.

Section data 304 is input into a section file, which turns the data into web content. Each theme may have at least one section file 310, such as one section file 310 for each section, where the section files 310 contain templating code to render the online store information. Section files 310 may also contain configuration data, directives, and the like, to support the section file. Online store information stored as section data 304 is then rendered as web content in a section of the web page through the section file 310. In a simplified, non-limiting example, suppose the user wants to create a new product page. The user determines one section of the product page will contain a product description. The user then enters the product description for that section, such as through a user interface for managing the presentation of online store information, which is stored as section data 304. That section data 304 is then rendered as web content through the templating code stored in the section file 310 for the selected section.

Separating the section data 304 from the section files 310 of the active theme 306 enables a more effective way to apply section data 304 to a theme or for the switching or presentation of section data 304 to or through an alternate available theme 308 if the user decides to switch themes, such as after the user has established a non-trivial amount of section data 304 associated with the online store. If the online store information had been integrated with the code to render the online store information or theme, every time the user wanted to switch themes, such as for the presentation of the online store, the user would have to put great effort into rebuilding the online store. By separating the online store information (stored as section data 304) from the code to render the online information (stored in the section file 310) the e-commerce platform 100 may provide for a more efficient switching or presentation of online store information to or by a theme, such as from an active theme 306 to a new theme from the selection of available themes 308 provided by the e-commerce platform 100. Whenever the user adds new online store information to a section of the active theme 306 the new information may adjust the display of the online store information as rendered through the section file 310. However, the online store information stored as section data 304 is not integrated with the active theme 306, so that when the user switches themes the section data 304 can be more easily applied to a section file 310 of the newly selected theme, and be rendered differently per the new theme without the user needing to adjust the online store data for presentation with the new theme.

The simplest approach for eliminating the need to make any adjustments to the section data 304 when switching themes would be to have a fixed set of section file types for all themes. That way there would be a one-to-one match between section types in any two themes and switching themes would be very straightforward. This however would significantly reduce the individuality and variety of the different themes for presentation of online information. All themes would be essentially the same. To accommodate the need for both standardization and flexibility in how themes present online store information, the e-commerce platform 100 may assign section data 304 to be either content data or presentation data. Content data may be for instance an image content that includes an image file, a URL, and a piece of rich text; a text content that includes a segment of rich text and a title; a product content that includes a reference to a product object (in which case, the content is not stored inside the section, but only a reference to it is maintained); and the like. Content data is common and usable across themes. Presentation data is not required to be common across themes. It may ideally be reusable but not required to be so in order to provide a quality user experience. Presentation data may be for instance an auto-play setting (e.g., executed through a checkbox or a dropdown); a text font size (e.g., a number); a number of images in a row of images (e.g., executed as a gallery or grid); and the like.

As such, content data may be considered standardized data across themes and presentation data may be considered unstandardized data. Content data and presentation data may be considered to be broadly the same, except that content data is backed by a strict data model defined by the e-commerce platform 100. For example, the presentation of image data may be controlled as content data as determined by a standardized data model as a combination of a file, a link/URL, and a caption/text. Unstandardized presentation data may be associated with a more loosely controlled data model across themes, specified by specific themes in each section file 310 (e.g., a "slideshow auto-play" setting could be optionally done as a binary checkbox or as a dropdown with multiple options). The data model may also determine section data 304 to be content data as standardized data (fitting a specified data model) or presentation data as unstandardized data (not fitting a specified data model).

Creating standardized data ensures that content data can be reused across different sections of different themes (that support the same content), allowing users to switch themes without losing their content from their pages. Unstandardized presentation data is not always reused but may be reused through section matching engine 302 mechanisms to do so when possible. Unstandardized data is useful because that information is tied to specific design traits of themes, enabling users and theme developers to create unique designs. Balancing the number of sections with standardized versus unstandardized data determines the ease with which users may move between themes while minimizing the impact of using unstandardized data, ensuring that as much information as possible can be reused across themes (so that switching themes carries over as much information as possible) while enabling themes to create a wide range of sections that do not all have the same design layout and customization options.

As such, section data 304 being rendered through a section file 310 of the active theme 306 may or may not be directly used in a section of a new theme selected from the available themes 308. In order to make the evaluation as to whether the section data 304 is applicable or not to a section of a new theme, the e-commerce platform 100 utilizes the section matching engine 302.

In embodiments, the section matching engine 302 may enable users to switch a given section data 304 to be rendered with different section files 310 within one theme. For example, a user may be able to add a section with an "image gallery" section file, populate that section with a group of images, and then switch that section to be rendered with a "slideshow" section file, if such section file is also able to render the content without loss or with an acceptable level of loss (e.g., as determined by the section matching engine). As such, users may try different layouts for their content. This may also allow users to rectify undesirable results which may be made by the section matching engine 302, thus improving the user experience. For instance, a 'preferred' section file as determined by the section matching engine 302 may be subjective (e.g., two users creating the same section with the same theme and switching to the same new theme may have different expectations of what section files they would pick) and therefore it may not be possible for the section matching engine 302 to produce results that are deemed correct by all users.

The section matching engine 302 includes an algorithm that matches section data 304 to sections within a theme at least in part through the theme's section file(s) 310, where the section matching engine 302 may consume section data 304 (source data) and at least one section file 310 (for rendering into a section of a theme), and either outputs a match of the section data 304 to the new section (via the section file) or a mismatch or partial mismatch of the section data 304 to the new section. For instance, in a matching case, the section matching engine 302 may determine a match where the section data 304 can be accommodated by the new section files 310. In embodiments, the section matching engine 302 may find a preferred section file 310, such as categorization of section files between those that can render the data (at all) and those that cannot, but may ultimately converge on one section file as a match. For example, where the section data 304 is a product description with text and a title, and the section file 310 for the new section renders text data as a header and block of text, the section matching engine 302 may determine there is a match. Referring to FIG. 4, this matching may be the result of section 410A and new section 410B being configured to accommodate standardized data, such as where these sections have been purposely configured to accommodate section data 304 across different themes.

In another instance, in a non-matching case, the section matching engine 302 may determine a mismatch between the section data 304 and a group of target section files 310 of a newly selected theme. In this instance, section matching engine 302 may attempt to adjust configuration settings in either the section data 304 or the section file 310 to make a fit or determine that the section data 304 needs to be manually configured to be accommodated by a section of the new theme. For example, the section data 304 may be a group of images with a data model that presents the images as a slide show in a section. Unfortunately, there are no section files 310 in the new theme that present images as a slide show. However, there may be a section that presents images in a gallery view. In this instance the section matching engine 302 may attempt to reconfigure the data model of the section data 304 to be viewed in a gallery view rather than as a slide show. If successful, the images are then presented in a gallery view, otherwise the mismatch persists, and a manual reconfiguration of section data 304 may be necessary. In another example, the section data 304 may be made of one image, one text passage, and one video, but there are no section files 310 in the new theme able to render that specific combination, but there is one section file 310 able to render images and text. In this instance, the section-matching engine 302 may determine to render the section with that section file 310, with the caveat that the video would not be displayed. This may be a better user experience than not displaying the section at all, which may be a fallback condition when there is no matching section file 310 that provides a preferred match. This mismatching may be the result of the section 410B and 420B being configured to accommodate unstandardized data, such as where there is no requirement for all themes to accommodate a slide show of images.

In another instance, in a partial matching case, the section matching engine 302 may determine a partial match between the section data 304 and the section file 310. For example, the data model for the section data 304 may be for a slide show of images at a rate specified by the user, but the section file 310 for the new section specifies a slide show with a fixed rate. In this instance, the section matching engine 302 may adjust the data model to be a fixed rate. In embodiments, the rate previously selected by the user may be retained as part of the section data 304 in case the user decides to switch to a theme that has a section with a slide show with a variable user-specified rate. The preceding examples and all examples herein are meant to be illustrative and not limiting in any way, where one skilled in the art will appreciate that the section matching engine 302 is configured to determine matches between section data 304 and section files 310 of different themes for the sake of switching section data 304 to a new theme, and where there are mismatches attempts to make adjustments to accommodate mismatch characteristics in order to accommodate the switching of the section data 304 to a new theme without the user needing to intervene to make manual adjustments. In this way the section matching engine 302 provides a needed service to the user by minimizing the impact of changing themes.

Section data 304 may be configured for display through a page resource, which stores a list of sections and their respective data for a given theme or multiple themes in a repository, where the repository may be a section, a collection of sections configured as a page, a page, and the like. Section files 310 may be stored in the theme and are used to turn the section data 304 into web content. A problem solved by the section matching engine 302 is the accommodation of potential differences between section data 304 on one hand and the section files 310 of destination sections on the other. When the section data 304 is standardized data a match should be found with sections of another theme. However, when the section data 304 is unstandardized, such as to allow themes to have unique or varied aesthetic presentation, there may be mismatches that require adjustments either by the section matching engine 302 or by the user (such as determined by the section matching engine 302). That is, section data 304 can input to a section file 310 in order to turn the data into web content only if that section file 310 is able to make use of the section data 304. For example, section data 304 containing image data can only be used with section files 310 that support rendering images (e.g., image gallery, slideshow, and the like). To determine compatibility between section data 304 and the section files 310 of a theme, the section matching engine 302 may take the section data 304 and a set of section files 310 (e.g., from one theme) as input, and return a matching section file (e.g., in another theme). One function of the section matching engine 302 is to determine which section files 310 support the rendering of that section data 304 (assuming a match can be found between the section file 310 and a group of section files), and then among those, which one is most appropriate to use, such as based on a number of criteria.

For instance, criteria may be whether a section file 310 supports rendering the combination of content types contained in the section data 304 (e.g., a single image, or an image and a text description, or multiple images and/or text descriptions). This may be a primary criterion, as it relates to whether the section data 304 is standardized or unstandardized data, where content data is modelled such that it can be reused across section files 310 that accept the same combinations of content types. Other criteria may be the extent to which a combination of content data types (e.g. a number or a particular order of different types) in the section data 304 resembles the combination(s) of content data types supported by the section file 310. For example, if the section data 304 contains three different types of content (e.g. a video, images and text descriptions) and there are two sections files 310, one that only supports two of the three types (e.g. video and images but not text) and the other that only supports one of the three (e.g. video only), then the section matching engine 302 may determine that the first section file is a better match. In another example, if the section data 403 is a set of images, and there are two section files 310, one that supports images only (e.g., an image gallery), and one that supports images along with other types of content (e.g., a generic grid section), then the section matching engine 302 determine that the first one is a better match. Other criteria may be the extent to which presentation data contained in the section data 304 resembles the presentation settings supported by the section file 310. For example, if the section data 304 contains three different presentation settings (or setting types) and there are two sections files 310, one that supports only two or all three settings and the other that supports only one of the three settings, then the section matching engine 302 may determine that the first section file is a better match. In another example, if the section data 304 is a set of images, and there are two section files 310, one that supports images only and with an auto-play setting (e.g., a slideshow), and one that supports images only but doesn't have an auto-play setting (e.g., an image gallery), then the section matching engine 302 may pick the first one. Additional criteria factors may include the extent to which section data 304 resembles section files 310 based on contextual information associated with creation of the section data 304 (e.g., images uploaded and related together, such as in a slide show). The section matching engine 302 may enable the reuse of presentation data of section data 304 across multiple section files 310, such as when those section files 310 model the presentation data the same way. For example, one slideshow section file 310 could specify an auto-play setting that is a checkbox, while another slideshow section file 310 of a different theme could have an auto-play setting that is a dropdown, with multiple options. In that case section matching engine 302 may not reuse the auto-play data, since the two section files 310 model it differently. But it would continue to store the data such that it can be reused if the user were to switch to a theme where it can be reused.

Because themes will not necessarily all have the same page sections and/or section files, when switching or previewing themes, the section matching engine 302 may need to determine which page sections in the new theme it should use to render, or make customizable, the existing section data 304 of pages (made with a different theme). The section matching engine 302 may match section data 304 with section files 310 (e.g., decide which section file 310 to use when rendering or customizing a section) within the currently active theme to use for the section data 304 in question. For example, suppose a user adds a slideshow to a page using the page section "slideshow" of theme A. When the user switches to theme B, which doesn't have a page section called "slideshow", the section matching engine 302 will determine which section file 310 the platform should use to render the slideshow. In embodiments, the section matching engine 302 may use various heuristics to determine the most appropriate section file 310 to use in theme B for the section data 304 created with "slideshow" of theme A. Heuristics may include looking for a section file 310 with the same filename (but using it only if its content data model schema is compatible with the section data 304 in question), finding the section file 310 with the content data model schema closest to the content data model schema of the section file 310 that was used to create the section; finding the section file 310 with the "name" attribute (and possibly an additional "type" attribute) closest to the "name" attribute of the section file 310 that was used to create the section, and the like.

In an example, suppose the content data model schema of a section data called "slideshow" is [image, video, product, collection] (i.e., the section accepts any number of those content types). In this case, only two images have been added to the slideshow. Inside theme B, multiple section files 310 could be used to render those images: "gallery" which has the same content data model schema as "slideshow" of theme A, "slider" which only accepts images, or any other content section or default section supported by the e-commerce platform 100. In embodiments, the section matching engine 302 may return "slider" as the best fit, even though "gallery" has the same content data model schema as "slideshow", because only images make up the content of the slideshow of theme A which is the content type supported by "slider" and as such, "slider" is determined to be closer to "slideshow".

When switching or previewing themes, users may naturally expect that the presentation of their content will change. A fallback may be to use a default section (which may accept any combination of content), which may still make for a good user experience, since users may be able to change what section file 310 is used for each section through a user interface. In embodiments, the default section may be the most appropriate section that should be returned by the section matching engine 302, since it is likely to be the most used section of every theme (e.g., being the most featureful and flexible). In embodiments, information about the section file 310 that was used to create a section may need to be stored, even as users switch to different themes.

In embodiments, switching from theme A to theme B, and then back to theme A, may result in no presentation changes (e.g., the website may need to look identical before and after). Additionally, the presentation of content (which section file 310 is used along with each section data 304) may not be allowed to change unexpectedly. From the previous example, after the user switches to theme B and the slideshow is matched with and rendered using "slider", it may not be allowed (e.g., without the user's input) to be rendered using a different section file 310 in theme B, even as the e-commerce platform 102 or the theme gets updated. Once a section data 304 is matched by the section matching engine 302 with a section file 310, the pairing may need to remain and not be re-evaluated each time the section is rendered (which could cause it to change).

In embodiments, matching data associated with the section matching engine 302 matching and switching section data to a new section through a section file, or a plurality of matching/switching such as in switching section data for a plurality of sections from a first theme to the plurality of sections of a second theme, may be stored. Stored matching data may then be used or leveraged at a future time, such as if the user changes themes multiple times and at some point returns to a similar switching event (e.g., similar section switching, similar theme switching, and the like). For instance, a user may start with Theme 'A' and request a switch to a Theme 'B', where the section matching engine 302 performs a number of matching sequences and stores the matching data. The user may then go on to switch themes a number of more times to eventually come back to switching back to Theme 'B' from another theme. The stored matching data may then be used by the section matching engine 302 to more effectively execute the switch (e.g., including adjustments made in switching unstandardized data).

Beyond making it possible for content to transfer between themes, the content model may also provide the section matching engine 302 with a knowledge base of the content being added to pages. For instance, a content model models content as structured data, and a Rich Text Editor models content as custom HTML. With the latter, it may be difficult to determine what the content consists of, how different parts relate to each other and should be laid out (e.g., in order to provide a good editing experience), reshape it into formats other than custom HTML, and the like.

A benefit of the section matching engine 302 is that it allows for retaining data and its usefulness (e.g., usable beyond the theme used to create it) even as users switch to themes that do not support all of the content types. When users switch themes, page data (both content and presentation data) does not change. Only the theme used to render or customize it changes. When the new theme does not support a particular content or presentation type of data (or combination thereof), the content data may not be rendered or displayed in exactly the same manner as with the previous theme or may not be rendered/displayed at all. In embodiments, the e-commerce platform 100 is configured to provide an editing user interface to allow users to edit the content or presentation data (e.g. change the content type combination of content types, or presentation settings) so that it can be re-used with a different theme that otherwise would support it.

With respect to unstandardized presentation data, when two page sections of two different themes model presentation data in the same way (e.g., some of their presentation settings have the same id, type, options or the like), the section matching engine 302 may carry over the presentation data tied to those sections as users switch between the two themes. For example, say theme A and theme B both have a "slideshow" section with an "auto-play" checkbox setting. When the section matching engine 302 matches a slideshow section data 304 made with theme A, with the "slideshow" section file 310 of theme B, in addition to carrying over all of the content data, the section matching engine 302 may also carry over the value of the "auto-play" setting. This may have the benefit of enabling presentation to transfer without adding any requirement or hard rule to the section matching engine 302 (e.g., without standardizing anything).

Figure 5:
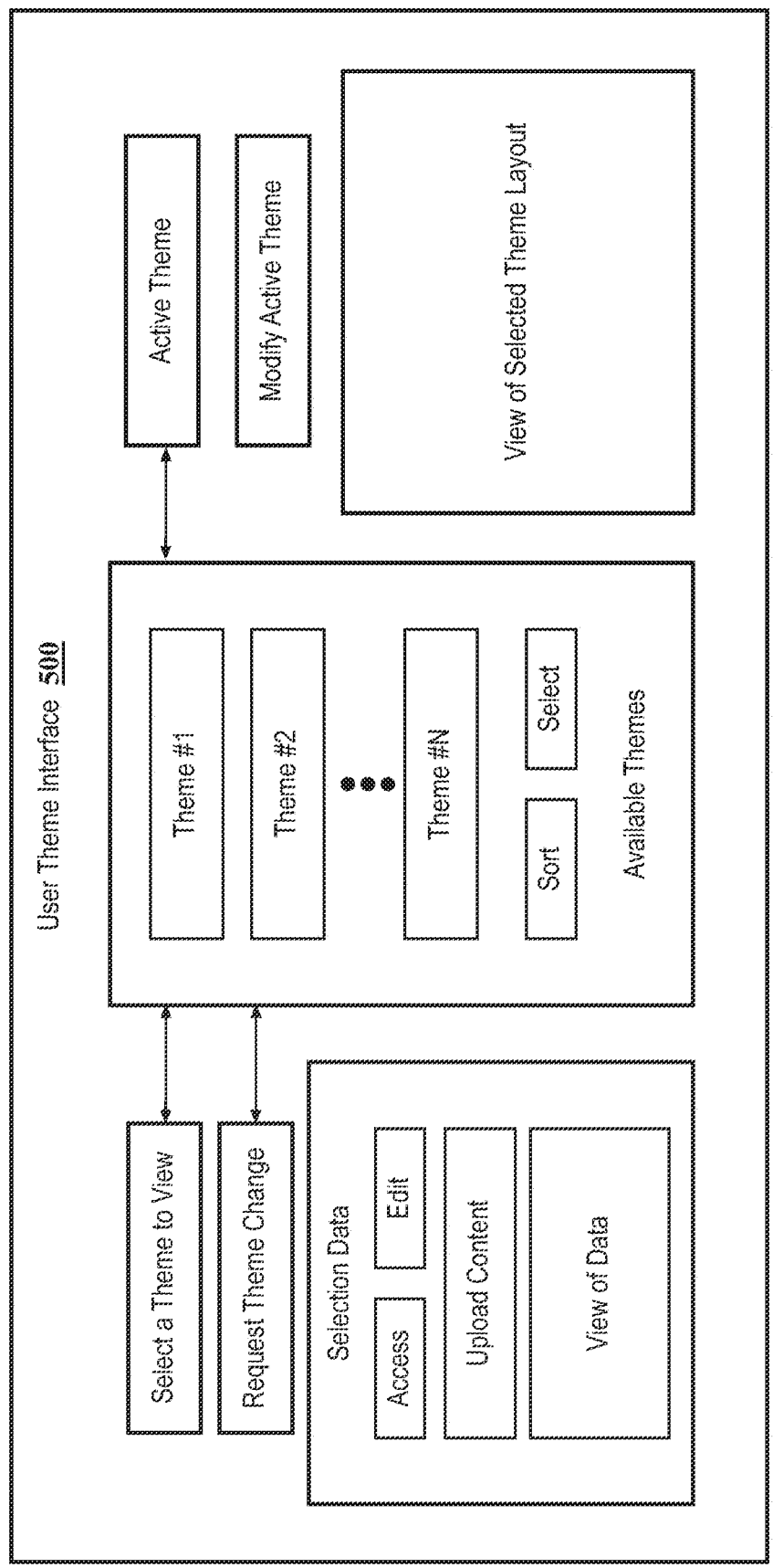
FIG. 5 depicts an embodiment for a user theme interface.

Referring to FIG. 5, in embodiments a user theme interface 500 may be provided, such as to provide access to theme configuration information currently active with the online store, alternate themes available to the online store, section data 304 stored in association with the online store, and the like. For instance, a user may be enabled to access the theme currently active with the online store and make modifications, such as the addition of new sections to a page, modifications to static sections (e.g., modifying content presentation), modifications to dynamic sections (e.g., layout of sections or modifying content presentation), and the like, where the user is able to view the changes to the current page as changes are made. The user may be enabled to access alternate themes available and switch themes to view how the online store would look with a new theme, such as where sections are switched from the currently active theme to a new theme by the section matching engine 302 (e.g., where the section matching engine 302 is generating a view of the online store with the new theme without executing the actual change to the theme of the online store). After viewing an alternate theme, the user may request a theme change from the active theme 306 to a selected alternate available theme 308, such as where the section matching engine 302 executes a switch of the section data 304 from the active theme 306 to a second theme from the available themes 308. In embodiments, a user's actions through the user theme interface 500 (e.g., a stream of clicks or actions input through the user theme interface 500) may be reflected in what is viewed by the user, such as when the user is switching between themes, adding content to section data, and the like. For instance, rendering section data on the user theme interface 500 may be based on a stream of data entry actions, based on characteristic matching of the section data and section files, and the like. The user may be provided access to the section data 304 for the online store, such as to upload new content, directly access and/or modify existing section data 304, input additional section data 304, and the like.

Figure 6:
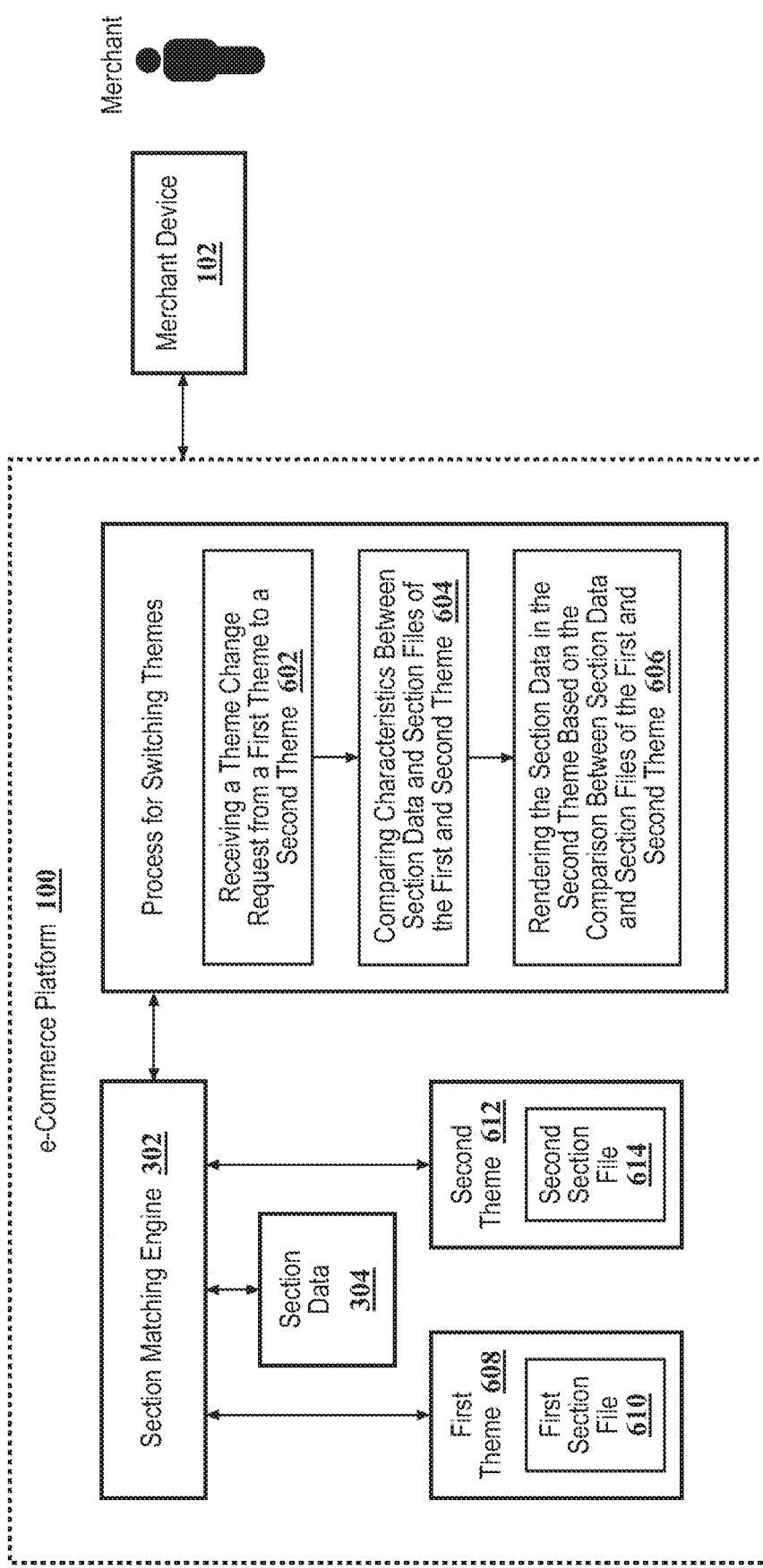
FIG. 6 depicts an embodiment for a functional-flow block diagram for an e-commerce platform with a section matching engine.

In embodiments, the section matching engine 302 may enable a user to apply online store information to switch themes for the online store, such as where the online content and information that the user has applied to a first theme is switched from the first theme to a second theme. Referring to FIG. 6, systems and computer-implemented methods may include receiving 602, at an e-commerce platform 100 from a merchant computing device 102, a theme change request from a first theme 608 to a second theme 612, such as for an online store 138. The online store 138 may include online store information as section data 304, such as where the section data 304 is rendered in a first page section of a plurality of page sections on a first online page as configured by a first section file 610 of the first theme 608. The theme change request may request a change from the first theme 608 to the second theme 612 for rendering the section data 304 in a second page section of a plurality of page sections on a second online page as configured by a second section file 614 of the second theme 612. In embodiments, characteristics between section data 304 and section files 610 and 614 of the first and second theme may be compared 604. For example, the section matching engine 302 may compare at least one characteristic of the section data 304 configured by the first section file 610 for rendering in a first page section and at least one characteristic of the second section file 614. In embodiments, the section data 304 may be rendered 606 in the second theme 612 based on the comparison between section data 304 and section files 610 and 614 of the first theme 608 and the second theme 612. For example, the section data 304 may be rendered on a second page section as configured by the second section file 614 if at least one characteristic of the section data 304 configured by the first section file 610 resembles at least one characteristic of the second section file 614.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method, comprising:
    storing, at an e-commerce platform:
        a plurality of themes, wherein each theme includes a respective plurality of section files, and each section file providing configuration for rendering at least one portion of at least one of the one or more pages with a layout and presentation as defined by the configuration,
        user-provided section data for a plurality of sections, wherein at least some of the section data is content data conforming to a standardized data model and at least some of the section data is presentation conforming to another data model,
        a merchant account associated with a first online store, the first online store utilizing a first theme selected from the plurality of themes, and the first online store having on or more pages configured to display the user-provided section data in accordance with the respective plurality of section files of the first theme;
    receiving, at the e-commerce platform from a merchant computing device associated with the merchant account, a theme change request including selection of a second theme from the plurality of themes, the second theme having a plurality of second section files, wherein the theme change request is a request to stop using the first theme and to use the second theme instead;
    matching the content data within the user-provided section data to corresponding one or more second section files based on the one or more second section files conforming to the standardized data model of that content data;
    comparing the presentation data within the user-provided section data to one or more second section files;
    identifying, based on the comparing, a partial match between the presentation data and one of the second section files as a best match, wherein the partial match includes a mismatch between at least one characteristic of the presentation data and said one of the second section files;
    responsive to identifying the partial match, changing said at least one characteristic of the presentation data to conform to said one of the second section files; and
    rendering the changed presentation data on a page of the first online store as configured by said one of the second section files.

2. The computer-implemented method of claim 1, wherein the at least one characteristic of the presentation data includes one or more of a content number, a content type, a presentation setting, a presentation setting type, or a combination thereof.

3. The computer-implemented method of claim 1, wherein the second section file includes templating code or Hypertext Markup Language.

4. The computer-implemented method of claim 1, wherein the page of the first online store includes a webpage.

5. The computer-implemented method of claim 1, wherein changing includes excluding at least some of the presentation data from the page of the first online store.

6. The computer-implemented method of claim 1, wherein changing includes altering said at least one characteristic to match a characteristic defined in said one of the second section files.

7. The computer-implemented method of claim 1, wherein changing includes modifying the another data model of the prestation data to conform to said one of the second section files.

8. The computer-implemented method of claim 1, wherein the content data includes a plurality of product images and the presentation data includes one or more display parameters relating to the product images.

9. The computer-implemented method of claim 1, wherein matching includes identifying, for a first section of content data conforming to a first standardized data model, a particular second section file defining layout and display of one or more data types matching one or more data types set in the first standardized data model.

10. The computer-implemented method of claim 9, wherein the particular second section file does not contain data types or elements not set in the first standardized data model.

11. An e-commerce platform, comprising:
at least one processor; and
memory, storing
  a plurality of themes, wherein each theme includes a respective plurality of section files, and each section file providing configuration for rendering at least one portion of at least one of the one or more pages with a layout and presentation as defined by the configuration,
  user-provided section data for a plurality of sections, wherein at least some of the section data is content data conforming to a standardized data model and at least some of the section data is presentation conforming to another data model,
  a merchant account associated with a first online store, the first online store utilizing a first theme selected from the plurality of themes, and the first online store having on or more pages configured to display the user-provided section data in accordance with the respective plurality of section files of the first theme, wherein the theme change request is a request to stop using the first theme and to use the second theme instead, and
  processor-executable instructions that, when executed by the processor, cause the processor to:
    receive, at the e-commerce platform from a merchant computing device associated with the merchant account, a theme change request including selection of a second theme from the plurality of themes, the second theme having a plurality of second section files;
    match the content data within the user-provided section data to corresponding one or more second section files based on the one or more second section files conforming to the standardized data model of that content data;
    compare the presentation data within the user-provided section data to one or more second section files;
    identify, based on the comparing, a partial match between the presentation data and one of the second section files as a best match, wherein the partial match includes a mismatch between at least one characteristic of the presentation data and said one of the second section files;
    responsive to identifying the partial match, change said at least one characteristic of the presentation data to conform to said one of the second section files; and
    render the changed presentation data on a page of the first online store as configured by said one of the second section files.

12. The e-commerce platform of claim 10, wherein the at least one characteristic of the presentation data includes one or more of a content number, a content type, a presentation setting, a presentation setting type, or a combination thereof.

13. The e-commerce platform of claim 10, wherein the second section file includes templating code or Hypertext Markup Language.

14. The e-commerce platform of claim 10, wherein the page of the first online store includes a webpage.

15. The e-commerce platform of claim 10, wherein the processor-executable instructions, when executed by the processor, are to cause the processor to change said at least one characteristic of the presentation data by excluding at least some of the presentation data from the page of the first online store.

16. The e-commerce platform of claim 10, wherein the processor-executable instructions, when executed by the processor, are to cause the processor to change said at least one characteristic of the presentation data by altering said at least one characteristic to match a characteristic defined in said one of the second section files.

17. The e-commerce platform of claim 10, wherein the processor-executable instructions, when executed by the processor, are to cause the processor to change said at least one characteristic of the presentation data by modifying the another data model of the prestation data to conform to said one of the second section files.

18. The e-commerce platform of claim 10, wherein the content data includes a plurality of product images and the presentation data includes one or more display parameters relating to the product images.

19. The e-commerce platform of claim 10, wherein the processor-executable instructions, when executed by the processor, are to cause the processor to match by identifying, for a first section of content data conforming to a first standardized data model, a particular second section file defining layout and display of one or more data types matching one or more data types set in the first standardized data model.

20. The e-commerce platform of claim 19, wherein the particular second section file does not contain data types or elements not set in the first standardized data model.

* * * * *